May 27, 1958 H. G. LANKFORD 2,836,117
CLAMP MEANS
Filed July 6, 1954 2 Sheets-Sheet 1
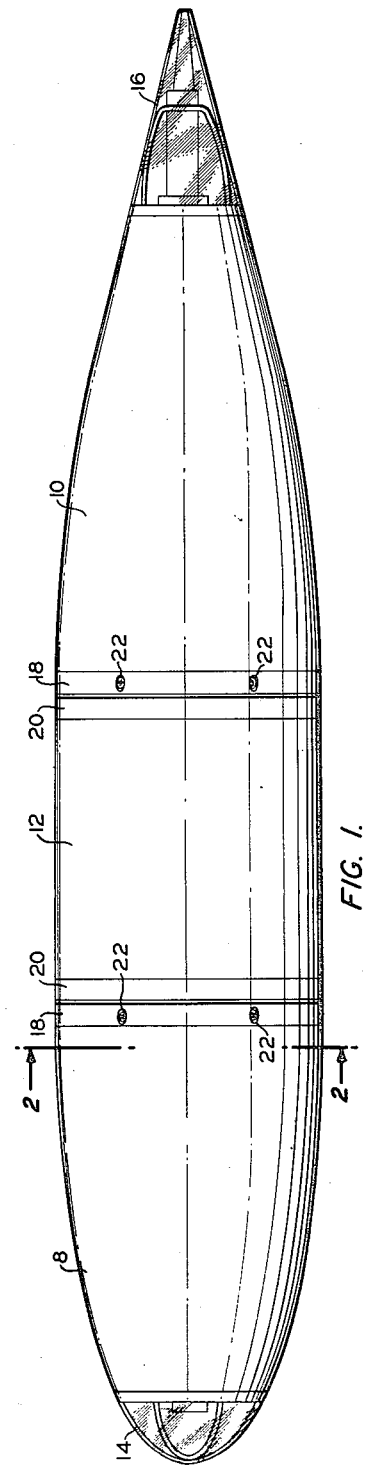
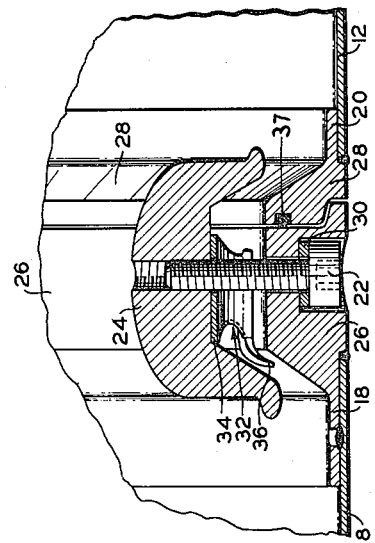
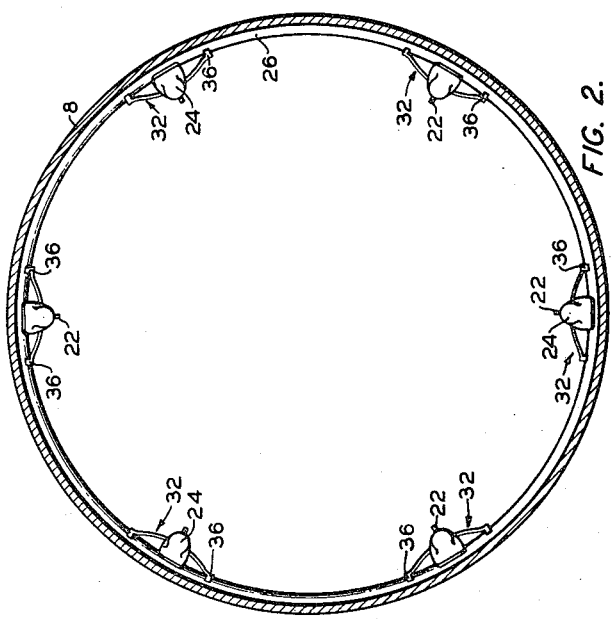
INVENTOR.
HARRY G. LANKFORD
BY
*John H. Widdowson*
ATTORNEY May 27, 1958  H. G. LANKFORD  2,836,117
CLAMP MEANS Filed July 6, 1954  2 Sheets-Sheet 2

INVENTOR.
HARRY G. LANKFORD
BY
John H. Widdowson
ATTORNEY

United States Patent Office 2,836,117
Patented May 27, 1958

2,836,117
CLAMP MEANS

Harry G. Lankford, Wichita, Kans.

Application July 6, 1954, Serial No. 441,610

3 Claims. (Cl. 102—2)

This invention relates to connecting articles. In a more specific aspect, this invention relates to clamp means for disengageably joining together articles having voids therein by holding them on the inside thereof. In a still more specific aspect, this invention relates to clamp means for joining together end to end hollow, aerial bomb case members, specifically clamp means for joining the hollow frusto-conoidal nose and tail sections of an aerial bomb case to the hollow cylindrical center section of such a bomb case at the base of the nose and tail sections.

Means are known in the art to join together members, by clamp means mounted inside the members, and specific clamp means are known and have been used to connect the tail and nose sections of streamlined bombs to a hollow cylindrical center section thereof by clamp means located inside the case members. This allows for the desired smooth outer surface of the assembled bomb. The bomb is made in two or more sections for numerous reasons, such as for easy loading of the bomb, to allow for convenient installation and inspection of such as the bulkheads within the bomb case, to allow for easier shipping and storing of the bomb cases, to allow for easy installation of fuse and arming equipment at a place other than that of manufacture of the cases, etc. The means of the prior art used to mount the nose and tail sections of the bomb case on the center section have many disadvantages. The clamp means is located inside the bomb case, which must be the case, and it is operated from outside the bomb case, which also is necessary, if a streamlined outer bomb case surface is to be had. The prior art means requires tedious adjustment prior to fitting the bomb case sections together, and these clamp means are easily displaced, resulting in a great deal of difficulty in readjusting. In addition, because of the nature of the clamp means of the prior art, it is necessary to handle and load the bombs in certain positions only, which leads to inconvenience, and requires a great deal of handling equipment and time. The assembling of the bomb case elements with the clamp means of the prior art is only successful to any degree if done so as to assemble the bomb with the longitudinal axis of same in vertical position. I have invented new clamp means which overcomes the many disadvantages and difficulties of the prior art means known to join together two articles from the inside thereof.

The new clamp means of my invention for connecting members together having portions on the inside of the members to be connected has a clamp body which contacts the inside portions of the members to hold them together. The clamp body is adjustably mounted within the members, and means are employed which are adapted to urge the clamp body out of its clamping position. The new clamp means of my invention holds the members together when the clamp body is adjusted to clamping position. In a preferred specific embodiment of the new clamp means of my invention, I employ a winged clamp body, the wings of which overlap raised portions on the inside of the two members to be connected. The winged clamp body is adjustably mounted within one of the members by bolt means projecting therethrough on which the clamp body is threadedly mounted. I prefer to spring load the clamp body by a leaf spring slidably mounted on the raised portion within the member, such leaf spring urging the clamp body out of clamping position and alining the clamp body out of clamping position to receive the other of the two members to be joined together. When the bolt means of my clamp means is tightened, the clamp means moves into clamping position with its wings overlapping the raised portions of the members to be joined and holding the members together. In one embodiment of my invention, I prefer that it be so constructed that the member to be joined not having the clamp body mounted thereon has notches to receive the bolt of my clamp means. This has been found to be a very advantageous way of easy and effectively positioning the members to be connected in proper position.

The new clamp means of my invention has many advantages over those means known in the prior art. They can be mounted on and shipped with the bomb case sections without loss, for the spring loading holds them tightly in position. With the use of my new clamp means the bomb can be assembled in any desired position, since the force of gravity tending to displace the clamps is overcome by the unique spring loading. The new clamp means of my invention are always in proper alinement to receive the member to be joined to the member on which the clamp body is adjustably mounted, and the clamp body without fail always moves into clamping position in relation to the members to be joined upon operation of the tightening means from without the bomb case, specifically the bolt means passing through the bomb case into the clamp body. While it is with the joining together of aerial bomb case elements, comprising hollow, frusto-conoidal tail and nose sections and a hollow cylindrical center section, that my new clamp means has been found very advantageous, one skilled in the art will appreciate that the new means of my invention can be used in many other applications to join together from the inside members having portions adaptable to receive a connecting member to hold the members together.

It is an object of this invention to provide new connecting means.

It is another object of the invention to provide new clamp means for connecting members together having portions on the inside of the members to be connected.

It is still another object of my invention to provide new clamp means for connecting together aerial bomb case members having raised portions around the inside of the end portions of the case members to be joined, more specifically clamp means, for joining together end to end hollow aerial bomb case members comprising frusto-conoidal nose and tail sections and a cylindrical center section, the center section being connected to the base of the nose and tail sections by the new clamp means of my invention mounted on the inside thereof.

Still another object of my invention is to provide new clamp means for the easier and more efficient handling and assembling of the clamp means for joining and the joining of streamlined aerial bomb case sections.

Other objects and advantages of the new clamp means of my invention will become apparent to one skilled in the art upon reading this disclosure.

Drawings accompany and are a part of this disclosure. Such drawings depict preferred specific embodiments of the new clamp means of my invention, and it is to be understood that such are not to unduly limit the scope of my invention.

In the drawings,

Fig. 1 is a longitudinal elevation view of a three-sectioned aerial bomb case whereon my new clamp means has been found to be very advantageous to join the nose and tail sections to the center section of such bomb case.

Fig. 2 is a view taken on line 2—2 of Fig. 1, showing my new clamp means mounted on the inside of said bomb case in clamping position.

Fig. 3 is an enlarged cross sectional view showing in detail the clamp means shown in Fig. 2 in open position.

Figure 4:
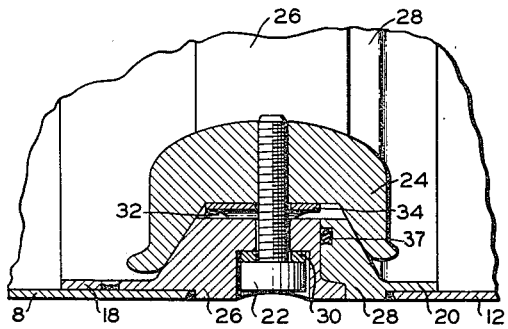
Fig. 4 is an enlarged cross sectional view showing the clamp means of Figs. 2 and 3 in closed position.

Following is a discussion and description of the new clamp means of my invention. Such discussion and description is made with reference to the drawings whereon the same reference numerals are used on the same or similar parts or structure. The discussion and description is of preferred specific embodiments of the new clamp means of my invention, and it is to be understood that such is not to unduly limit the scope of my invention.

Figs. 1 through 4 depict the new means of my invention used to connect hollow, frusto-conoidal nose section 8 and tail section 10 to hollow, cylindrical center section 12 of an aerial bomb case. A nose cap 14 and a tail cap 16 are mounted on the ends of the bomb to cover and protect the bomb fuse mechanism, etc. The nose section 8 and tail section 10 have a seal ring 18 welded thereto. The center section 12 has a seal ring 20 welded thereto on each end thereof. The clamp bodies of my invention are mounted on seal rings 18, and are operatable to be adjusted into open or clamping position by bolts 22 recessed in holes in rings 18.

The winged clamp bodies 24 with their projecting end portions in clamping position overlap the circumferential raised portions 26 and 28 of seal rings 18 and 20, respectively. Fig. 4 shows the clamp body 24 in clamping position with the wings of clamp body 24 in contact with portions 26 and 28 to hold them and as a result the bomb case elements together. Fig. 3 shows the clamp body in extended or open position, so that sections 8 and 10 can be mounted in proper position on section 12 of the bomb case for closing of the clamp means, and so that section 12 can be fitted under its arm of the clamp bodies 24. Bolts 22 extend through corresponding holes in the raised portion 26 of seal ring 18, and leaf spring 32, and clamp bodies 24 are threadedly mounted thereon so that turning the bolt closes or opens the clamp as desired. The holes in seal rings 18 are such that the head of the bolt 22 is recessed, and a seal washer 30 is preferably used. Leaf spring means 32 is preferably employed to urge clamp bodies 24 out of clamping position and to aline the clamp bodies in proper position to receive raised portions 28 of seal ring 20. Leaf spring 32 has a portion 34 which fits against the adjacent projecting end portion or wing of clamp body 24 and prevents the body member from turning around the longitudinal axis of bolt 22 when the bolt is turned, and so that the clamp means will be extended or retracted upon the turning of bolt 22. Springs 32 have projecting end portions 36 which overlap raised portions 26 of seal rings 18 to maintain the spring longitudinal to the raised portions 26 and in turn to maintain clamp bodies 24 transverse to raised portions 26 and in position to receive member 12. Leaf spring 32 is in slidable engagement with raised portion 26. A common deformable O-ring 37 in a groove in portion 28 of member 20 seals the bomb case at the juncture of portions 26 and 28 of members 18 and 20, respectively. The clamp means of my invention can be made out of any suitable material, metal having been found preferable when used to join together the metal aerial bomb case members, and I find it desirable that the spring 32 be formed of spring steel and that clamp body 24 be cast.

Figure 5:
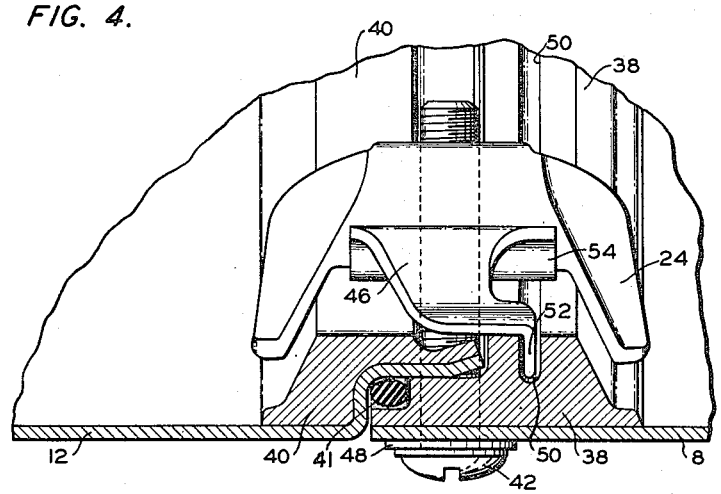
Fig. 5 is an elevation view, partly in cross section, of another preferred specific embodiment of the new clamp means of my invention in open position, preferably used to join together end to end hollow, cylindrically ended case members.
Figure 6:
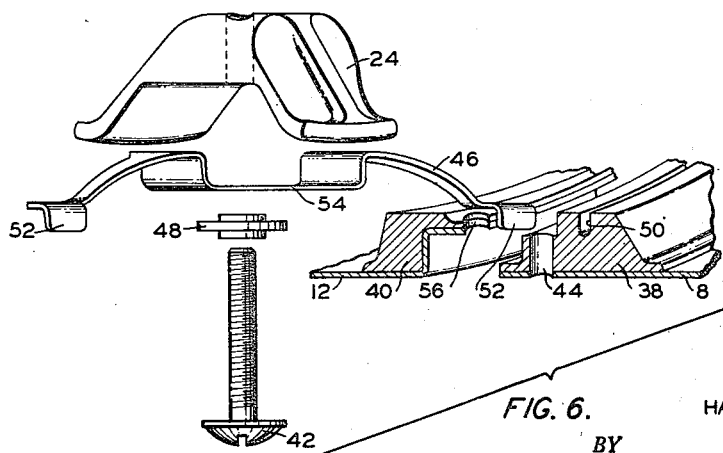
Fig. 6 is an exploded perspective view partly in cross section of the clamp means shown in Fig. 5.

Figs. 5 and 6 depict another preferred specific embodiment of the clamp means of my invention. The clamp means of Figs. 5 and 6 can be used on the case members of Figs. 1 through 4 with the necessary grooving of raised portion 26. However, the design of clamp means of Figs. 5 and 6 is shown used with differently designed case elements 8 and 12, having circumferential raised portions 38 and 40 around the inside thereof, respectively. In this instance separate seal rings are not employed, but such can be used, if desired. A common deformable O-ring 41 seals at the juncture of raised portions 38 and 40. In the means of Figs. 5 and 6, bolt 42, which can be recessed, if desired, passes through a hole 44, through members 8 and 38 and through a corresponding hole in leaf spring 46. Clamp body 24 is threadedly mounted on this bolt 42 so that clamp body 24 is moved into clamping position on tightening bolt 42 and into open position on loosening bolt 42. A seal washer 48 is preferably used in mounting. In this embodiment raised portion 38 has a groove 50 wherein projecting end portions 52 of spring 46 slidably ride during opening and closing of the clamp means. Leaf spring 46 has a middle saddle portion 54 which mounts clamp body 24 to prevent same from turning out of alignment for receiving member 12. Spring 46 is prevented from turning by the slidable mounting of end portions 52 in groove 50. Center member 12 and raised portion 40 have notches 56 therein which coincide with holes 44 and in which bolt 42 is received when members 8 and 12 are in position for closing the clamp means to clamp them together. This has been found to be very advantageous, making it easy to properly aline and position the members.

In use it has been found desirable to mount the new clamp means of my invention on sections 8 and 10 during manufacture where they remain during shipping and storing. At assembly the bolt adjusting means is loosened to open the clamps as in Fig. 4. Then sections 8 and 10 are mounted on section 12 in joined position. Tightened the bolt means closes the clamps to rigidly connect the bomb case members.

As one skilled in the art can see, the new clamp means of my invention can be used to disengagedly connect together members other than the hollow bomb case members depicted, for example, the means can be used to connect together sections of tube or pipe, solid members with void spaces therein having raised portions over which a clamp body can fit or which can receive the ends of the clamp body. The spring means to urge the clamp body out of clamping position and the means to aline the clamp body 24 in proper receiving position has been found particularly advantageous in regard to ease and cost of manufacture and convenience and efficiency of use.

As will be evident to those skilled in the art, various modifications of my invention can be made, or followed, in the light of this disclosure and discussion, without departing from the spirit or scope of the disclosure or from the scope of the claims.

I claim:

1. Clamp means for joining together end to end hollow, aerial bomb case members, comprising, in combination, circumferential raised portions around the inside of the end portions of said case members to be joined, one of said raised portions having a longitudinal groove therein and a plurality of spaced holes therethrough and the other of said raised portions having a plurality of notches coinciding with said holes and adapted to receive a bolt, a clamp body adapted to be disposed longitudinal to and inside said case members, said clamp body having projecting end portions adapted to overlap said raised portions to hold said case members together and having a threaded hole, bolt means adapted to pass through one of said holes in said raised portion and into said threaded hole in said clamp body to threadedly and adjustably mount same, and leaf spring means slidably mountable on said last-named raised portion, said spring means having end portions projecting therefrom to extend into said groove in said raised portion and a recessed middle portion with a hole therethrough to receive said bolt means and said middle portion adapted to receive and cradle said clamp body, said spring means adapted to urge said clamp body out of clamping position and to maintain said clamp body longitudinal to said case members, and said clamp means adapted to hold together said case members when same are positioned together with said bolt means in one of said notches in said raised portion and said bolt means is tightened.

2. Means to join together end to end hollow bomb case members in sealed relation, comprising, in combination, a circumferential raised portion around the inside of the inner end of each of the case members to be joined, said raised portions being beveled on the inner sides, having abutting portions and overlapping portions on the outer sides when joined, one of said raised portions having a recess therearound in the outer side to receive a deformable sealing member in said recess to seal between said case members when joined, and one of said raised portions having a plurality of spaced holes therethrough, and clamp means comprising, a plurality of clamp bodies, said clamp bodies having projecting end portions to overlap said raised portions to hold said case members together, said projecting portions having inner faces corresponding to the bevel of said inner sides of said raised portions, and said clamp bodies having a threaded hole therethrough in a portion between said projecting end portions, bolt means mountable through said holes in said raised portion and threadedly in said clamp bodies, separate spring means engageable with said raised portion having said spaced holes therethrough and said clamp body to urge said clamp bodies out of clamping position, said spring means having portions to receive said bolt means to maintain said spring means in position between said raised portion and said clamp bodies, and a deformable sealing member to fit between said raised portions of said case members in said recess of said one of said raised portions, and upon tightening said bolt means with said clamp bodies mounted to overlap and contact said raised portions of said case members and with said deformable sealing member mounted therebetween, said clamp means adapted to force said raised portions together to deform said deformable sealing member and tightly seal between said case members.

3. Means to join together end to end hollow bomb case members in sealed relation, comprising, in combination, a circumferential raised portion around the inside of the inner end of each of the case members to be joined, said raised portions being beveled on the inner sides, having abutting portions and overlapping portions on the outer sides when joined, one of said raised portions having a recess therearound in the outer side to receive a deformable sealing member in said recess to seal between said case members when joined, and one of said raised portions having a plurality of spaced holes therethrough, and clamp means comprising, a plurality of clamp bodies, said clamp bodies having projecting end portions to overlap said raised portions to hold said case members together, said projecting portions having inner faces corresponding to the bevel of said inner sides of said raised portions, and said clamp bodies having a threaded hole therethrough in a portion between said projecting end portions, bolt means mountable through said holes in said raised portion and threadedly in said clamp bodies, spring means comprising, separate leaf springs slidably mounted on said raised portion having said spaced holes therethrough, said leaf springs having end portions projecting therefrom to overlap said last-named raised portion, and having middle portions with apertures therethrough to receive said bolt means, and said leaf springs engageable with said clamp bodies and said last-named raised portion to urge said clamp bodies out of clamping position, and a deformable sealing member to fit between said raised portions of said case members in said recess of said one of said raised portions, and upon tightening said bolt means with said clamp bodies mounted to overlap and contact said raised portions of said case members and with said deformable sealing member mounted therebetween, said clamp means adapted to force said raised portions together to deform said deformable sealing member and tightly seal between said case members.

References Cited in the file of this patent

UNITED STATES PATENTS

| | | |
|---|---|---|
| 437,276 | Bauer | Sept. 30, 1890 |
| 831,551 | Guttzert | Sept. 25, 1906 |
| 2,108,654 | Dalley | Feb. 15, 1938 |
| 2,545,481 | Maier | Mar. 20, 1951 |
| 2,643,901 | Manoogian | June 30, 1953 |